(12) United States Patent
Cardella

(10) Patent No.: US 10,514,057 B2
(45) Date of Patent: Dec. 24, 2019

(54) CUSHIONED CARABINER CLIP

(71) Applicant: Tammie Cardella, Chino Hills, CA (US)

(72) Inventor: Tammie Cardella, Chino Hills, CA (US)

(*) Notice: Subject to any disclaimer, the term of this patent is extended or adjusted under 35 U.S.C. 154(b) by 0 days.

(21) Appl. No.: 15/588,551

(22) Filed: May 5, 2017

(65) Prior Publication Data

US 2017/0307004 A1 Oct. 26, 2017

Related U.S. Application Data

(60) Provisional application No. 62/331,980, filed on May 5, 2016.

(51) Int. Cl.
| | |
|---|---|
| *F16B 45/02* | (2006.01) |
| *E05B 17/00* | (2006.01) |
| *E05B 15/10* | (2006.01) |
| *E05C 1/16* | (2006.01) |

(52) U.S. Cl.
CPC ............ *F16B 45/02* (2013.01); *E05B 15/102* (2013.01); *E05B 17/0041* (2013.01); *E05B 17/0045* (2013.01); *E05B 2015/107* (2013.01); *E05C 1/16* (2013.01); *Y10T 24/45319* (2015.01)

(58) Field of Classification Search
CPC .......................... Y10T 24/45319; F16B 45/02
See application file for complete search history.

(56) References Cited

U.S. PATENT DOCUMENTS

| | | | | |
|---|---|---|---|---|
| 3,563,430 A | * | 2/1971 | Forrest | A45F 5/00 224/255 |
| 6,688,259 B2 | * | 2/2004 | Axel | A01K 27/00 119/792 |
| D631,331 S | * | 1/2011 | Kelleghan | D8/356 |
| D642,449 S | * | 8/2011 | Blaney | D8/356 |
| 8,695,179 B2 | * | 4/2014 | Dunn | F16B 45/02 24/599.1 |
| D731,875 S | * | 6/2015 | Bao | D8/356 |
| 2002/0179023 A1 | * | 12/2002 | Axel | A01K 1/0613 119/729 |
| 2009/0183347 A1 | * | 7/2009 | Abels | F16B 45/02 24/599.6 |

* cited by examiner

*Primary Examiner* — Robert Sandy
*Assistant Examiner* — Michael S Lee
(74) *Attorney, Agent, or Firm* — Manatt, Phelps & Phillips, LLC

(57) ABSTRACT

The present invention relates to an improved carabiner system, including an impact-dampening cushion around the external surface of the frame for cushioning damage during a fall or collision and to reduce sound from loose or swinging carabiner collisions. Additional surface routing and through holes provide improved register between the carabiner frame and the over-molded cushion layer.

20 Claims, 9 Drawing Sheets

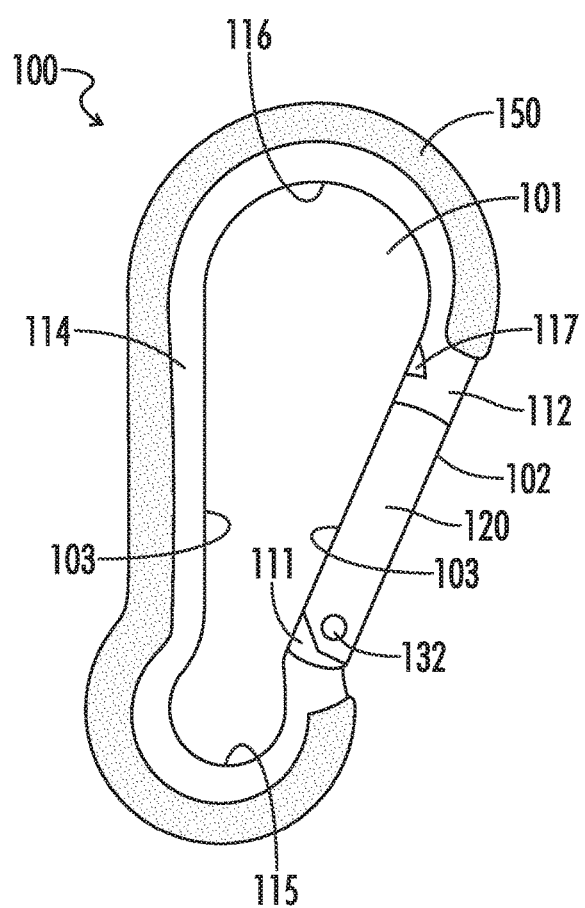
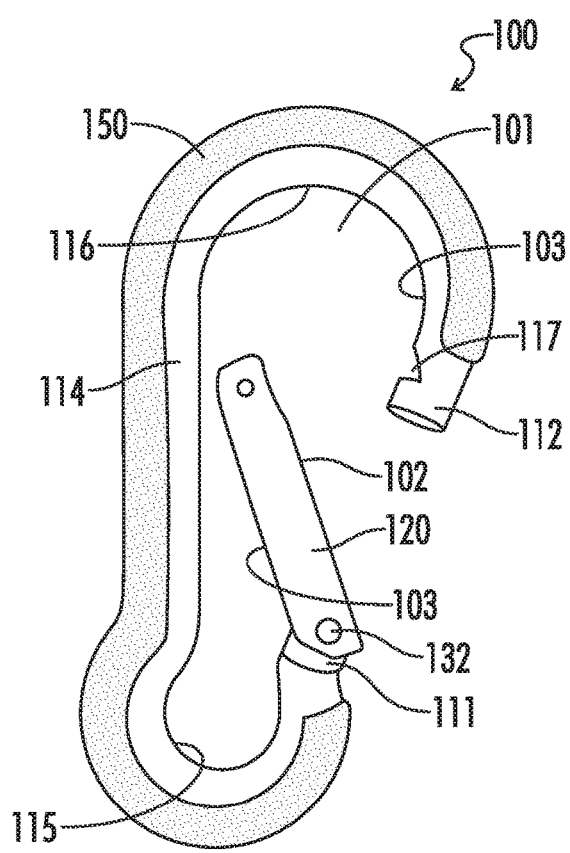
FIG. 1
FIG. 2

CUSHIONED CARABINER CLIP

INCORPORATION BY REFERENCE TO RELATED APPLICATIONS

This patent application claims the benefit of priority to and is a continuation of U.S. Provisional Application No. 62/331,980, titled "Cushioned Carabiner Clip" and filed May 5, 2016, which is incorporated herein by reference in its entirety.

BACKGROUND

Field of the Invention

This patent document relates to a fastening clip and methods of manufacturing and use thereof. This patent document relates more particularly to a carabiner clip including a cushion layer to reduce impact and damage from impact.

Description of the Related Art

A carabiner is a mechanical device used to link rope, slings, or climbing aids together. Carabiners are popular in rope-intensive activities such as climbing, boating, sailing, farming/ranching, skydiving and aerial sports, construction, trucking, and safety systems. Carabiners are also used in less demanding roles as key rings, connecting water bottles to backpacks, holding electrical cords, securing animal leashes or restraints, or to quickly construct tents, canopies, or clotheslines.

Carabiners typically consist of a rigid loop with a spring-loaded gate used to quickly and removably attach two components or a single component to a rope. Most carabiners include a frame, a gate, a hinge, and a spring. A traditional carabiner is generally a C-shaped frame connected to a spring-loaded, hinged gate. When the gate is closed, the C-shaped frame and gate form a closed loop around an interior cavity. When the gate is open, the opening between the gate and the C-shaped frame allows insertion of a rope or loop into the interior cavity. A spring provides force to return the gate to the closed position to prevent unintended detachment.

Carabiners intended to secure heavy items, valuable property, or human bodies are constructed from stronger materials and thicker components if intended for carabiners. Lighter materials and thinner carabiners may be used for less intensive activities unrelated to safety. Stronger materials and thicker frames result in heavier and larger carabiners.

The inventors here have found that the carabiners intended for use in certain activities can be unwieldy and cause injury and/or damage when released under tension or dropped. As an example, a heavy, steel carabiner used in recreational boating to connect moorings or tow ropes can easily crack or chip the fiberglass hull of an expensive boat if dropped or released. Additionally many climbers or construction workers have experienced unpleasant bumps and bruises from loose carabiner collisions. Accordingly, it is here recognized that a continued need exists to overcome and improve upon such shortcomings in conventional carabiners. In order to address the above-described exemplary problems, and other similar problems, what is needed is a cushioned carabiner that will absorb some of the shock of impact and dampen the noise produced by a loose carabiner without sacrificing durability or functionality, thereby providing enhanced functionality, safety, and convenience to the user.

SUMMARY

Various aspects are described in connection with an illustrative implementation of the cushioned carabiner disclosed herein. The various aspects are disclosed in the written specification including the drawings, and claims, and may be combined to form claims for a device, apparatus, system method of manufacture and/or use in any way, consistent with the teachings herein, without limitation.

The cushioned carabiner comprises a uniquely configured and constructed carabiner including a cushion layer attached to the spine of the carabiner frame. In some aspects, the cushion layer covers most or all exposed (internal and external) surfaces of the frame, excluding those areas that interfere with gate or mechanical movement. In some aspects, the cushion layer is molded to the frame and covers the external surface of the frame, cushioning the external areas likely to impact in a collision if dropped or swung. In some aspects the cushion layer covers only specific external surfaces of the frame, while in other aspects, the cushion may cover most or all of the outward facing surfaces of the frame. In some aspects, the internal surface of the carabiner frame may remain uncovered by the cushion layer so that the internal surface of the carabiner remains durable and low-friction for sliding ropes. In other aspects, some or all of the internal surfaces (facing toward the interior cavity) of the carabiner frame may include a cushion layer while the external surfaces remain exposed (or cushionless). In some aspects, the gate may also include a cushion layer on the external surface, on the interior surface, or on all surfaces.

In some aspects, the cushion layer is thick and soft enough to significantly reduce the energy of impact. In other aspects, the cushion layer is intended to only dampen sound from clanging metal or to provide some level of external friction, so the cushion layer may be relatively thin or composed of alternate materials. In some aspects, the cushion layer is manufactured from silicon, rubber, synthetic rubber, plastic, plastic alternatives, fabric, plant matter, paper, recycled materials, cellulose, bioisoprene, resin, or any other cushioning material. In some aspects the frame and/or gate may be formed of the same or different materials, including (but not limited to) any of steel, stainless steel, 316 stainless steel, iron, aluminum, titanium, tin, zinc, copper, brass, bronze, wood, plastic, carbon fiber, and composite. In some aspects, the frame and/or gate are electro-polished or electro-coated. In some aspects, the frame and/or gate may include contours, grips, or additional curves. In some aspects, the frame and/or gate are forged, molded, carved, rolled, or pressed. In some aspects the frame is co-molded with the cushion layer.

In various aspects, the carabiner can be formed in a variety of alternate shapes to optimize performance for specific purposes. In some aspects, the carabiner includes a locking mechanism, a wire gate or hollow gate, multiple gates providing access to multiple interior cavities, or multiple internal cavities accessed through a single gate. In another aspect, the carabiner frame may include an additional closed loop without a gate for securing ropes that are tied to the loop rather than clipped with a gate. In another aspect, the carabiner may include two or more separately-gated internal cavities. In further aspects, a carabiner may include multiple separately gated interior cavities connected by a rigid connecting structure. In still other aspects, a carabiner system may include multiple separate carabiners connected by a flexible rope, strap, or fastener. In another aspect, the hinge may be pivoted and the gate may instead open outward or to the side. In another aspect, various lock mechanisms may be provided to secure the gate and avoid inadvertent release.

Various alternative implementations of the foregoing aspects are disclosed. The foregoing various aspects may be combined in any manner without limitation.

BRIEF DESCRIPTION OF THE DRAWINGS

FIG. 1 is a right side view of an exemplary cushioned carabiner in the closed position, the cushioned carabiner comprising a cushion layer disposed on the external surface of the frame.

FIG. 2 is a right side view of an exemplary cushioned carabiner in the open position, the cushioned carabiner comprising a cushion layer disposed on the external surface of the frame.

DETAILED DESCRIPTION OF THE EMBODIMENTS

Figure 3:
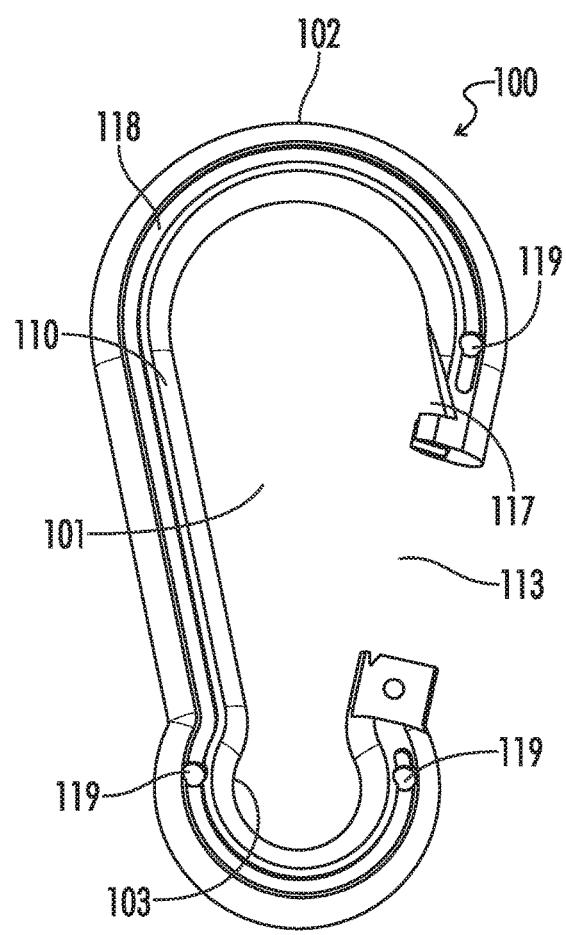
FIGS. 3 and 4 are right and left side photographs of an exemplary cushioned carabiner frame before the cushion layer is connected, revealing the underlying structure. The depicted carabiner frame is shown without the gate and hinge.
Figure 4:
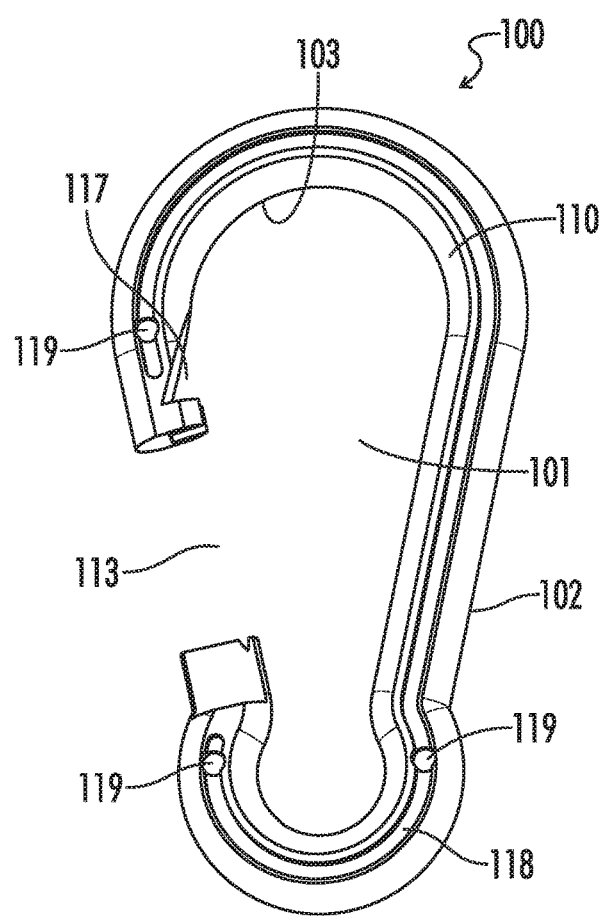

The features, aspects and advantages are described below with reference to the drawings, which are intended to illustrate but not to limit the invention. In the drawings, like reference characters denote corresponding features consistently throughout the drawings. FIGS. 1-11 illustrate various aspects of an embodiment of the cushioned carabiner 100. It should be understood, however, that the teachings herein are not limited to any particular carabiner and are applicable to other fasteners.

As illustrated in FIGS. 1-11, the carabiner frame 110 is a generally C-shaped metal piece with a gate opening 113 between the two ends 111, 112 of the frame 110. The proximal end 121 of a gate 120 sized and dimensioned to span the gate opening 113 is affixed to a proximal end 111 of the frame 110 by a hinge 130 (comprising a hinge pin or rivet 132 inserted through both gate hinge hole 124 and frame hinge hole 133), and the distal end 122 of the gate 120 rests against or is otherwise in relative proximity to the nose or distal end 112 of the frame 110. Together the frame 110 and gate 120 form a closed loop around an interior cavity 101. The frame 110 and gate 120 each include external surfaces 102 and internal surfaces 103.

An inward force applied to the gate 120 can pivot the gate 120 around the hinge 130, creating a gap between the distal end 122 of the gate 120 and the nose 112 of the frame 110. While the gate 120 is open, ropes or loops can be fed through the gate opening 113, and when the inward force is removed, a hinge spring 131 (not shown) applies pressure to return the gate 120 to its rest position and close the carabiner 100, securing any loops or ropes in the interior cavity 101. At rest, the hinge spring 131 applies pressure to the gate 120, pressing it outward from the interior cavity 101 so that the distal end 122 of the gate 120 is pressed against or rests against a notch 117 in the nose 112 of the frame 110, keeping the gate 120 from swinging open in response to any outward force applied from the interior cavity 101 (such as by a clipped rope). A lock 140 can be built into the gate, the frame, or the hinge that maintains the gate in a closed position.

The cushion layer 150 can be attached directly to the surface of the frame 110 with adhesive (not shown), but surface texturing 118 (e.g., grooves, holes, or other surface adjustments that increase contact area and corners between the cushion layer 150 and the frame 110 or gate 120) significantly improves the connection and prevents peeling and damage. Through holes 119 allow the cushion layer 150 to flow through the frame 110, significantly improving durability and attachment of the cushion layer 150.

With reference to FIGS. 1 and 2, carabiner frame 110 and/or gate 120 may be formed from a variety of metals, alloys, and rigid materials including, but not limited to steel, stainless steel, 316 stainless steel, iron, aluminum, titanium, tin, zinc, copper, brass, bronze, wood, plastic, resin, carbon fiber, and composite. The frame 110 and/or gate 120 may be formed of the same or different materials. Similarly the elements of the hinge 130 and lock 140 may be made from the same materials as the frame or from a different material. In some aspects, the frame 110 and/or gate 120 are electro-polished or electro-coated to improve corrosion resistance and surface texture. The frame and gate 110, 120 of the carabiners may be molded into the desired shape, may be powder-pressed, or shaped by bending alloy rods into the desired shape. Fine-tuning the curve and cross-section, forming the surface-texture 118, through holes 119, gate hinge hole 124, or frame hinge hole 133 may be performed by machine stamping or machining. After the proper structure is achieved, these elements may be heat-treated to increase the strength thereof. The frame may be generally C-shaped, which in the present context equates generally to a loop missing a section, similar to the letter C. The frame may also encompasses any style or configuration of carabiner body, including at least oval, D-shaped, offset D-shaped, pear shaped, S-hook, double-gate or multi-gate, or any other style of quick-fastener.

The frame 110 extends from the proximal end 111 to the distal end or nose 112. The gap between the proximal end 111 and the distal end 112 of the frame 110 is the gate opening 113, which is spanned by gate 120. The proximal end 111 of the frame 100 includes a frame hinge hole 133 for connecting the hinge 130 with a hinge pin or rivet 132. The nose 112 may include a notch (or a hook or fastener) 117 for securing a gate pin or other securing mechanism 123 at the distal end 122 of the gate 120. The bend closest to the proximal end 111 is the crotch 115. The bend closest to the distal end or nose 112 is the basket. The spine 114 is the long, sometimes reinforced section between the crotch 115 and the basket 116. The spine 114 may be reinforced or thicker to provide extra strength or support. In some embodiments, the frame 110 may include a concave section between the crotch 115 and the spine 114.

The gate 120 comprises a proximal end 121 connected to the frame 110 by the hinge 130 and a distal end 122. An inward force applied to the gate 120 will pivot the gate 120 about the hinge 130, providing a gap between the distal end 122 of the gate 120 and the distal end 112 of the frame 110, through which the interior cavity 101 can be accessed. An outward force applied from within the interior cavity 101 (such as by a rope or loop) presses the distal end 122 of the gate 120 against a notch or other feature of the nose 112, transferring stress to the spine 114. The gate 120 may be straight, concave, convex, or a combination of concave and convex. A convex gate provides a wider opening for access to the interior cavity 101 while a concave gate makes it easier to apply the gate opening force directly with a rope or loop.

The hinge 130 comprises a hinge pin or rivet 132 inserted through a gate hinge hole 124 at the proximal end 121 of the gate 120 and the frame hinge hole 133 of the frame 110. The gate 120 pivots about the hinge pin 132, providing an opening for access to the interior cavity 101. Alternatively hinge pin 112 can be a screw, a ball-and-socket joint, or any other pivotable attachment mechanism. Hinge 130 may also include a hinge spring 131 (not shown). Hinge spring 131 may be either a housed spring or cantilevered spring. A housed spring and piston requires a hollow cavity in the gate member, but cantilevered springs may be more cost-effective and stronger. Hinge spring 131 applies a force to return gate 120 to its default position. In most cases, the default position is a closed gate 120, but in some specific instances, a default open gate 120 may be preferable. In alternate instances, the hinge may open inward, outward, or laterally.

Figure 5:
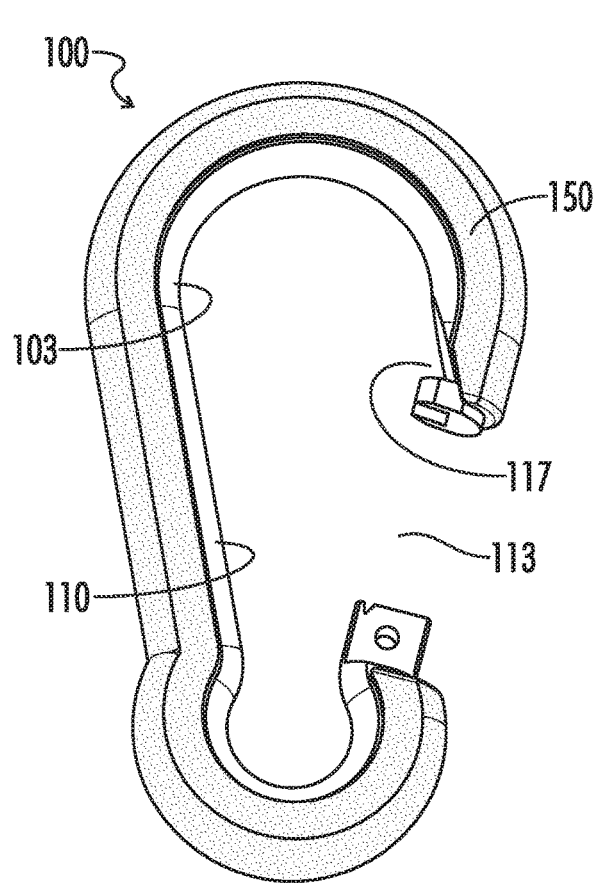
FIGS. 5 and 6 are right and left side photographs of an exemplary cushioned carabiner frame. The depicted carabiner frame is shown without the gate and hinge.
Figure 6:
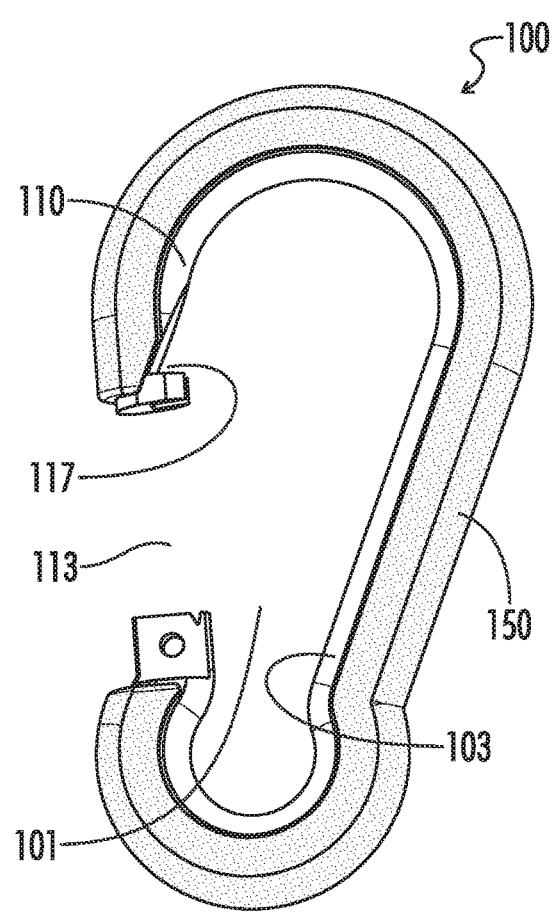

FIGS. 5-6 depict an exemplary cushioned carabiner frame 110 including a cushion layer 150 attached to the frame 110. The cushion layer 150 may be molded directly over the frame 110. In some instances, an adhesive may be applied between the frame 110 and the cushion layer 150 to improve the connection and durability of the carabiner 100.

In FIGS. 5 and 6, a single continuous cushion layer 150 is applied to the entire external surface 102 of the frame 110, leaving the internal surface 103 exposed. This configuration cushions the carabiner clip from most angles without interfering with gate or lock movement. Additionally the exposed internal surface 103 retains the benefits of the durable metal (or other material) surface, including durability and low friction for ropes. It should be understood that in other embodiments, the cushion layer 150 may coat both the external surface 103 and the internal surface 102. In still other embodiment, only the internal surface 103 is covered by a cushion layer 150, while the external surface 102 remains exposed. A fully cushioned carabiner frame 110 or internally cushioned carabiner frame may be preferable to avoid leaving scratches or marks or simply to reduce clanging between metal pieces during movement.

The cushion layer 150 may be manufactured from silicon, rubber, synthetic rubber, plastic, plastic alternatives, fabric, plant matter, paper, recycled materials, cellulose, bioisoprene, resin, or any other material. It may be preferable to injection-mold the cushion layer 150 around the frame 110 or gate 120. In some instances, the carabiner frame 110 and the cushion-layer 150 may be co-molded through a dual-injection process, quickly and reliably producing a 2-material product.

In some instances, the carabiner frame and cushion layer 150 may provide additional benefits, beyond impact-absorption and noise-dampening. The cushion layer 150 or carabiner frame 110 may be made of conductive materials, and as a weight applied to the carabiner 100 slightly elongates the frame 110, the conductive cushion-layer 150 or the conductive carabiner frame 110 functions as a strain gauge, reading the change in electrical properties (resistance, resistivity, conductivity) and translating that change of state to estimate the load force. The estimated load force or the electrical properties changes may be transmitted to or detected by an outside computer. The conversion may occur outside of the carabiner 100. In another embodiment, the cushion layer is intentionally formed of an insulating layer to prevent electrical conductivity, even if the underlying carabiner frame is made of a conductive material.

Alternatively the cushion layer may be formed of a material that measures G-force, and once a certain G-force level is experienced, the cushion layer or a part thereof changes color. In some instances, this G-force cushion layer provides additional security and confidence by affirmatively indicating when a significant impact renders a carabiner unreliable for future use.

Returning now to FIGS. 3 and 4, carabiner frames 110 similar to those depicted in FIGS. 5 and 6 are shown without the cushion layer 150. The frame 110 includes a surface texture or routing 118 and through holes 119 to increase the connection between frame 110 and cushion layer 150. The surface texture increases the contact area and the "grip" between the frame 110 and the cushion layer significantly, and the through holes 119 allow an injection-molded cushion layer 150 to flow through the frame 110, creating loops through the frame that further secure the cushion layer 150 in place and prevent peeling and prolonging the useful life of the carabiner. Placing through holes 119 at or near the various curved segments of the carabiner clip improves adhesion near those points. In the present embodiment, 3 through holes 119 pass through the frame within the surface routing 118. Two of the through holes are located on opposite sides of the crotch, while the third through-hole is located between the nose 112 and the basket 116. It should be noted that through-holes 119 reduce the strength of the frame 110 in the area immediately surrounding the through-hole, so through-holes should not be placed in high-strain areas if avoidable. In some embodiments, through-holes should not be included along the spine.

Figure 7:
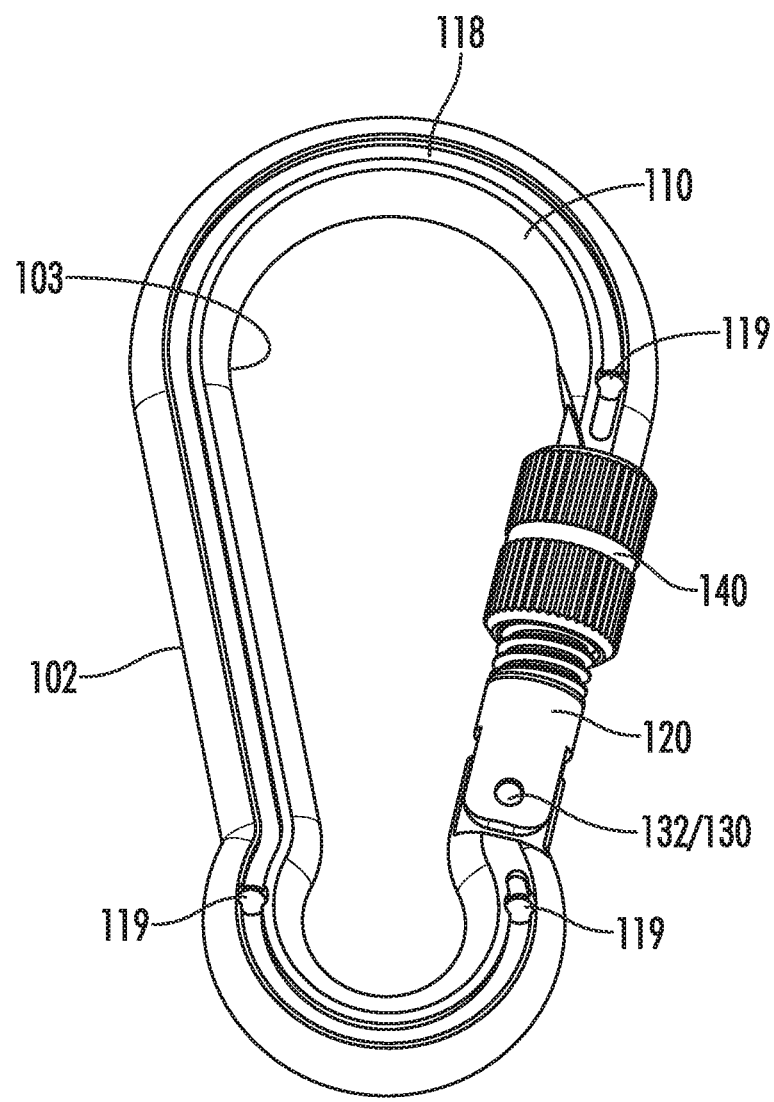
FIGS. 7 and 8 are right and left side photographs of an exemplary locking cushioned carabiners before the cushion layer is connected, revealing the underlying structure. The depicted carabiners include a screw-type locking mechanism and the gate is in the closed position.
Figure 8:
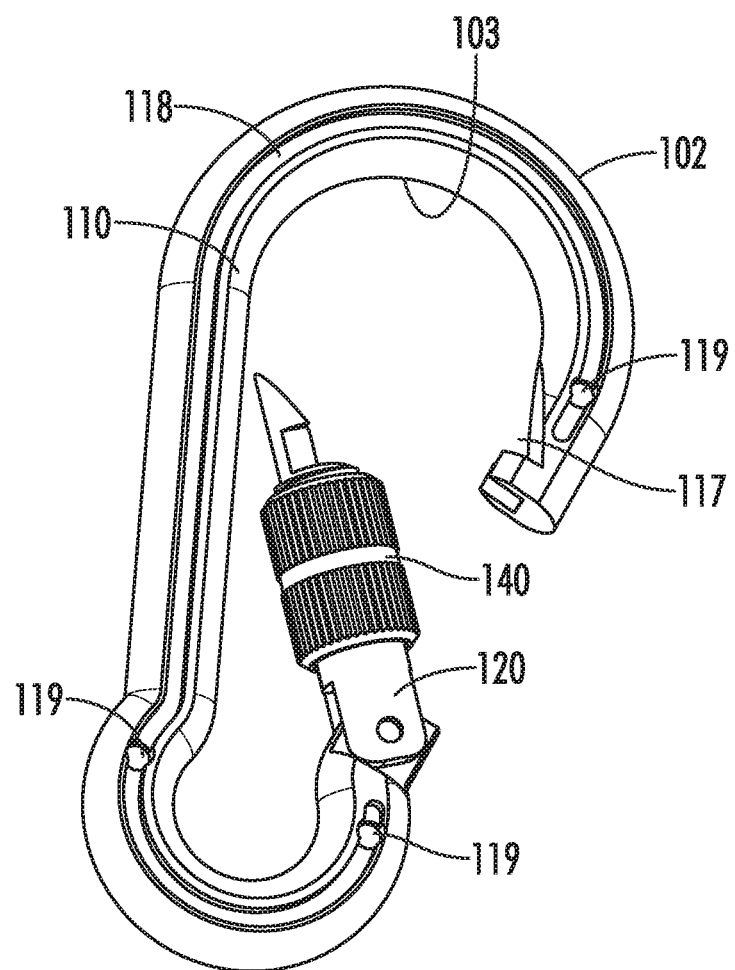
Figure 9:
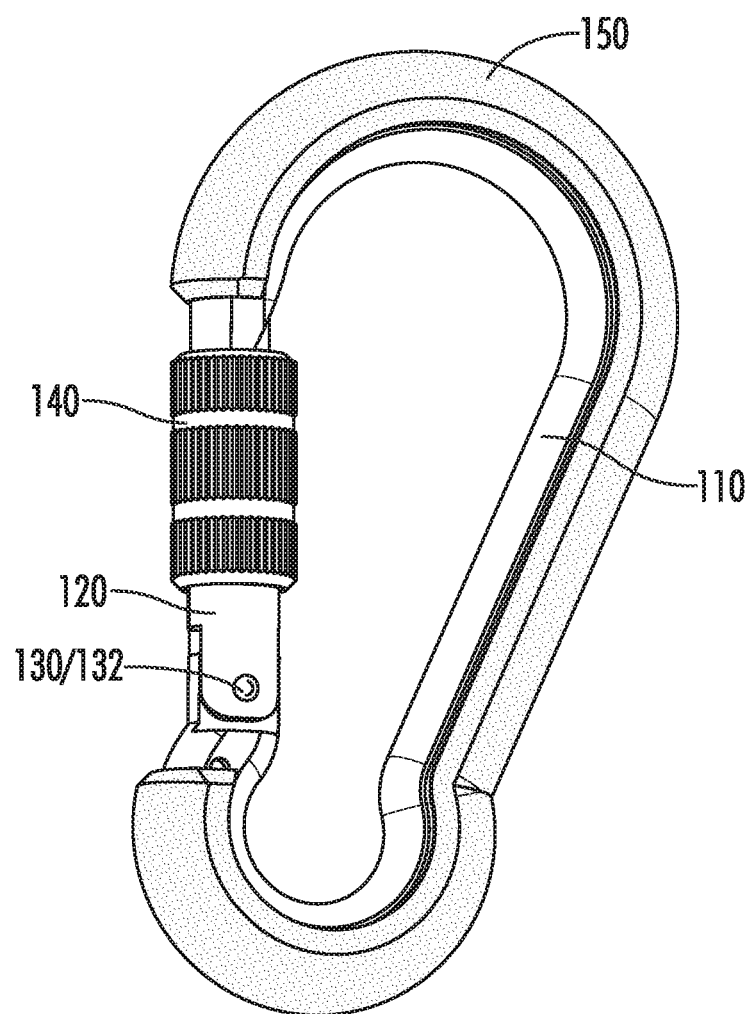
FIG. 9 is a left side view of an exemplary locking cushioned carabiner. The depicted carabiner includes a screw-type locking mechanism and the gate is in the open position.
Figure 10:
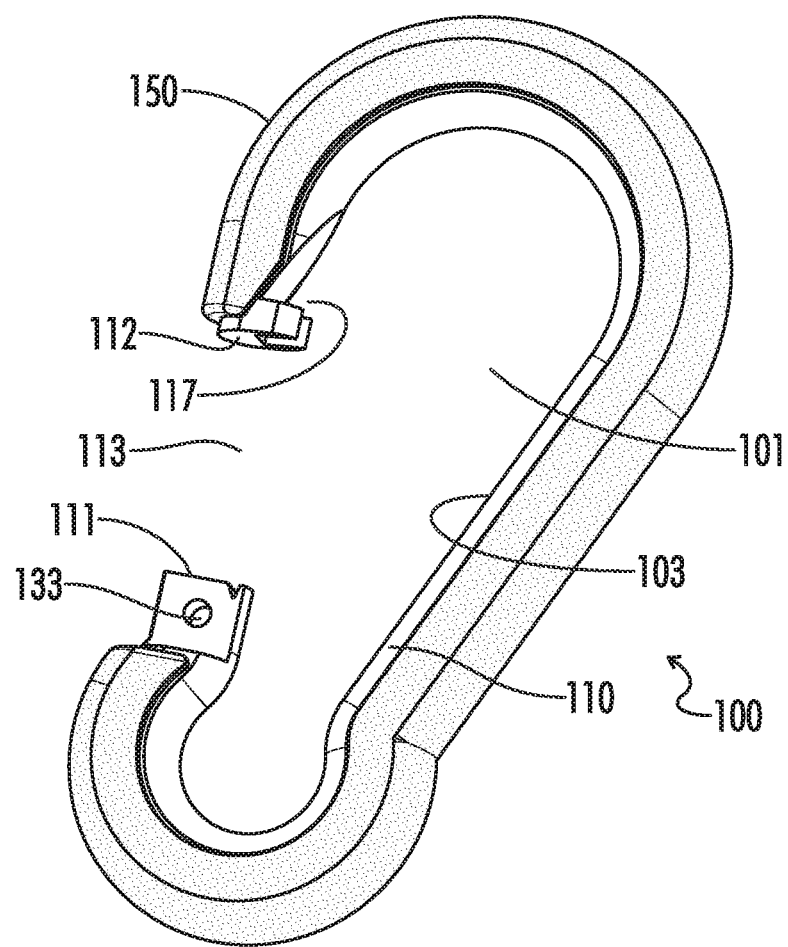
FIGS. 10 and 11 are alternate perspective views of a cushioned carabiner frame.
Figure 11:
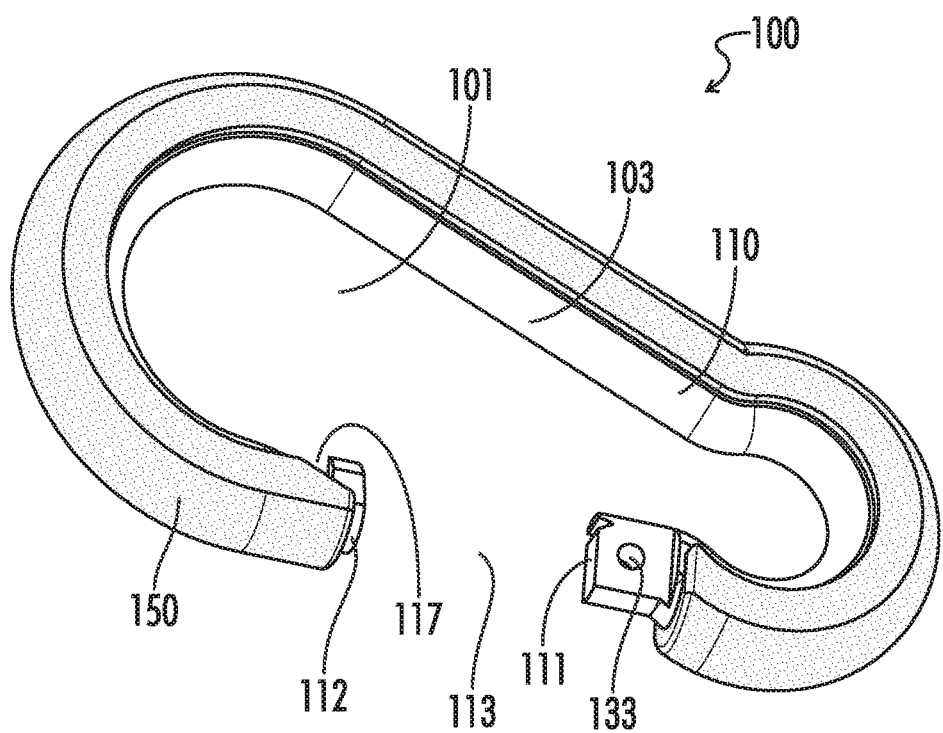

As shown in FIGS. 7-9, some carabiners may include a lock 140 to secure the gate 120 relative to the frame 110. The lock 140 ensures that gate 120 will remain closed until intentionally opened, and reduces the risk to health, life, and property. The lock of FIGS. 7-9 is a screw-type lock, which includes a screw-type rotating fastener, which can be rotated multiple times about the gate 120, forming a rigid sleeve that covers both a portion of the gate 120 and a portion of the frame 110 to strengthen the closed loop. Alternately, some twist-type gate locks require that the gate element 140 be pressed against a lock spring (not shown), rotated about the gate 120, and then a pressure applied to the gate 120 will cause the gate 120 to pivot about hinge 130. Other types of gate locks may include ball-lock mechanisms and additional latches or supports.

Figure 12:
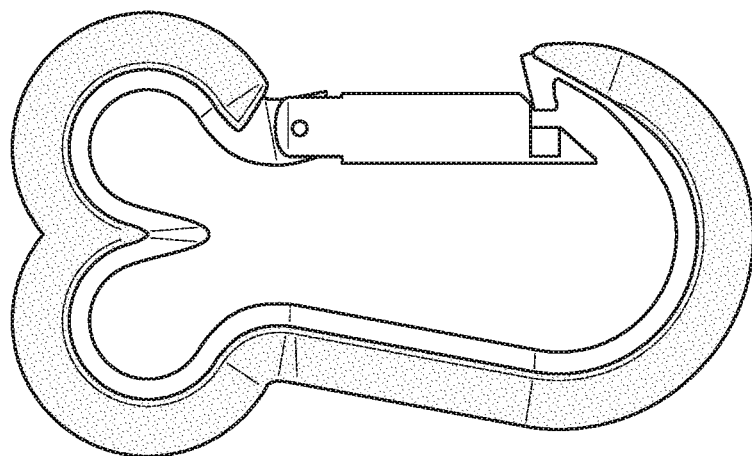
FIG. 12 is a view of an alternate double-crotch cushioned carabiner frame.

As shown in FIG. 12, an alternate embodiment of the present invention may include a double crotch cushioned carabiner frame, including a first crotch 115a and a second crotch 115b. The two separate crotches 115a, 115b enable the carabiner frame 110 to secure two ropes or loops simultaneously, minimizing friction and tangling between the two ropes with the two discrete crotches 115a, 115. One of ordinary skill in the art would understand that a multi-crotch cushioned carabiner frame could include more than two crotches without departing from the present invention. Additionally a further alternate embodiment not shown includes a multi-basket, including more than one basket 111a, 111b. In some instances a carabiner may include multiple baskets 111a, 111b and multiple crotches 115a, 115b. Each crotch may be open to the interior of the carabiner clip or may be wholly looped by a reinforced element. The multiple crotch and multiple basket embodiments require more complex surface texture or routing 118 and potentially additional through-holes 119 to secure the cushion layer 150 to the frame 110.

Although various aspects are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A carabiner, comprising:
    a generally C-shaped frame having a proximal end and a distal end at opposite ends of an elongated section with a gate opening between the proximal end and the distal end, the generally C-shaped frame having an internal surface generally defining an interior cavity and an external surface opposite the internal surface;
    a gate pivotally attached to the proximal end of said frame to span said gate opening and configured to open and close for access to the interior cavity of said frame, said gate and said frame together forming a closed shape when the gate is closed; and
    a cushion layer secured to and covering a portion of the external surface of the generally C-shaped frame;
    wherein the cushion layer does not cover the internal surface of the generally C-shaped frame.

2. The carabiner of claim 1, wherein the entire internal surface of the generally C-shaped frame is exposed.

3. The carabiner of claim 2, wherein the generally C-shaped frame further comprises:
    a spine positioned opposite the interior cavity from the gate opening;
    a first concave curved portion connecting the spine to the proximal end; and
    a second concave curved portion connecting the spine to the distal end.

4. The carabiner of claim 3, wherein the cushion layer covers the external surface of the spine.

5. The carabiner of claim 3, wherein the cushion layer comprises a single cushion layer continuously covering the external surface of the generally C-shaped frame from the first concave curved portion to the second concave curved portion.

6. The carabiner of claim 5, wherein the generally C-shaped frame includes at least one groove and the material of the cushion layer fills and attaches to the at least one groove to increase the bond between the cushion layer and the generally C-shaped frame.

7. The carabiner of claim 6, further comprising one or more through-holes extending through the generally C-shaped frame, and the material of the cushion layer loops through the at least one through-hole.

8. The carabiner of claim 5, wherein:
    a first groove is formed on a first side surface of the generally C-shaped frame between the internal surface and the external surface and the material of the cushion layer fills and attaches to the first groove, strengthening the bond between the cushion layer and the generally C-shaped frame; and
    a second groove is formed on a second side surface of the generally C-shaped frame between the external surface and the internal surface, the second side surface being opposite the first side surface, and the material of the cushion layer fills and attaches to the second groove, strengthening the bond between the cushion layer and the generally C-shaped frame.

9. The carabiner of claim 8, wherein the generally C-shaped frame includes one or more through-holes extending from the first side surface to the second side surface, and the material of the cushion layer loops through the at least one through-hole.

10. The carabiner of claim 9, wherein at least one through-hole is aligned with and connects the first groove to the second groove.

11. The carabiner of claim 8, wherein the generally C-shaped frame includes a first through-hole between the proximal end and the first concave curved portion, a second through-hole between the distal end and the second concave curved portion, and a third through-hole between the first concave curved portion and the spine, each of the through-holes extending from the first side surface to the second side surface, and the material of the cushion layer loops through each of the first, second, and third through-holes.

12. The carabiner of claim 11, wherein at least one through-hole is aligned with and connects the first groove to the second groove.

13. The carabiner of claim 3, wherein the generally C-shaped frame includes:
    a first through-hole between the proximal end and the first concave curved portion;
    a second through-hole between the distal end and the second concave curved portion; and
    a third through-hole between the first concave curved portion and the spine;
    wherein each of the through-holes extend from a first side surface of the generally C-shaped frame between the internal surface and the external surface to a second side surface of the generally C-shaped frame between the external surface and the internal surface, the second side surface being opposite the first side surface.

14. The carabiner of claim 13, wherein:
a first groove is formed on the first side surface of the generally C-shaped frame; and
a second groove is formed on the second side surface of the generally C-shaped frame;
wherein the material of the cushion layer fills the first and second grooves and loops through each of the first, second, and third through-holes, strengthening the bond between the cushion layer and the generally C-shaped frame.

15. A carabiner, comprising:
a generally C-shaped frame comprising:
   a proximal end and a distal end at opposite ends of an elongated section;
   a gate opening between the proximal end and the distal end;
   an internal surface generally defining an interior cavity and an external surface opposite the internal surface
   a spine positioned opposite the interior cavity from the gate opening;
   a first concave curved portion connecting the spine to the proximal end; and
   a second concave curved portion connecting the spine to the distal end;
a gate pivotally attached to the proximal end of said frame to span said gate opening and configured to open and close providing access to the interior cavity of said frame, said gate and said frame together forming a closed shape when the gate is closed; and
a single continuous cushion layer secured to and covering the external surface of the generally C-shaped frame from the first concave curved portion to the second concave curved portion;
wherein the cushion layer does not cover the internal surface of the generally C-shaped frame and the entire internal surface is exposed.

16. The carabiner of claim 15, wherein:
a first groove is formed on a first side surface of the generally C-shaped frame between the internal surface and the external surface and the material of the cushion layer fills and attaches to the first groove, strengthening the bond between the cushion layer and the generally C-shaped frame; and
a second groove is formed on a second side surface of the generally C-shaped frame between the external surface and the internal surface, the second side surface being opposite the first side surface, and the material of the cushion layer fills and attaches to the second groove, strengthening the bond between the cushion layer and the generally C-shaped frame.

17. The carabiner of claim 16, wherein the generally C-shaped frame includes a first through-hole between the proximal end and the first concave curved portion, a second through-hole between the distal end and the second concave curved portion, and a third through-hole between the first concave curved portion and the spine, and the material of the cushion layer loops through each of the first, second, and third through-holes.

18. The carabiner of claim 17, wherein each of the first, second, and third through-holes is aligned with and connects the first groove to the second groove.

19. The carabiner of claim 15, wherein the generally C-shaped frame includes:
a first through-hole between the proximal end and the first concave curved portion;
a second through-hole between the distal end and the second concave curved portion; and
a third through-hole between the first concave curved portion and the spine;
wherein each of the through-holes extend from a first side surface of the generally C-shaped frame between the internal surface and the external surface to a second side surface of the generally C-shaped frame between the external surface and the internal surface, the second side surface being opposite the first side surface.

20. The carabiner of claim 19, wherein:
a first groove is formed on the first side surface of the generally C-shaped frame; and
a second groove is formed on the second side surface of the generally C-shaped frame;
wherein the material of the cushion layer fills the first and second grooves and loops through each of the first, second, and third through-holes, strengthening the bond between the cushion layer and the generally C-shaped frame.

* * * * *